(12) United States Patent
Kichise

(10) Patent No.: US 8,754,638 B2
(45) Date of Patent: Jun. 17, 2014

(54) ROTATION SENSOR AND ROTATIONAL ANGLE DETECTION APPARATUS

(75) Inventor: Hiroshi Kichise, Kariya (JP)

(73) Assignee: JTEKT Corporation, Osaka (JP)

( * ) Notice: Subject to any disclaimer, the term of this patent is extended or adjusted under 35 U.S.C. 154(b) by 383 days.

(21) Appl. No.: 13/328,424

(22) Filed: Dec. 16, 2011

(65) Prior Publication Data

US 2013/0049741 A1 Feb. 28, 2013

(30) Foreign Application Priority Data

Aug. 25, 2011 (JP) ................................ 2011-183918

(51) Int. Cl.
*G01B 7/30* (2006.01)

(52) U.S. Cl.
USPC ................................ 324/207.16; 324/207.25

(58) Field of Classification Search
None
See application file for complete search history.

(56) References Cited

U.S. PATENT DOCUMENTS

| | | | | |
|---|---|---|---|---|
| 8,278,916 B2 * | 10/2012 | Sakai | ...................... | 324/207.25 |
| 2005/0242802 A1 | 11/2005 | Matsumoto et al. | | |
| 2007/0146169 A1 | 6/2007 | Otsuka et al. | | |
| 2010/0045227 A1 | 2/2010 | Ura et al. | | |

FOREIGN PATENT DOCUMENTS

| | | |
|---|---|---|
| EP | 1 684 051 A1 | 7/2006 |
| EP | 2 159 548 A2 | 3/2010 |
| JP | A-2006-138778 | 6/2006 |

OTHER PUBLICATIONS

Nov. 28, 2012 Extended European Search Report issued in European Patent Application No. 11195491.3.

* cited by examiner

*Primary Examiner* — Minh N Tang
(74) *Attorney, Agent, or Firm* — Oliff PLC

(57) ABSTRACT

A resolver includes three resolver coils, which are arranged spaced apart in a circumferential direction of a rotor, and an excitation coil that generates a magnetic field to induce voltages in the resolver coils when receiving electric power. When the magnetic fields provided from the excitation coil to the three resolver coils are changed through rotation of the rotor, the voltages induced in the resolver coils are changed. This causes each of the three resolver coils to output three-phase signals having amplitude that changes in a sinusoidal manner with respect to the rotational angle of the rotor. The angular intervals between the corresponding adjacent pairs of the first to third resolver coils in the circumferential direction of the rotor are defined as first, second, and third division angles. Specifically, the first to third division angles are set to values different from one another.

8 Claims, 12 Drawing Sheets

ROTATION SENSOR AND ROTATIONAL ANGLE DETECTION APPARATUS

CROSS-REFERENCE TO RELATED APPLICATIONS

This application is based upon and claims the benefit of priority from prior Japanese Patent Application No. 2011-183918, filed on Aug. 25, 2011, the entire contents of which are incorporated herein by reference.

BACKGROUND OF THE INVENTION

The present invention relates to a rotation sensor that outputs a three-phase signals corresponding to the rotational angle of a rotor and to a rotational angle detection apparatus employing the rotation sensor.

Conventionally, a power steering apparatus for a vehicle has rotational angle detection apparatuses mounted in a steering shaft and an electric motor. FIG. 12 shows an example of a rotational angle detection apparatus that detects the rotational angle of a rotary shaft such as a steering shaft.

As illustrated in FIG. 12, the rotational angle detection apparatus includes a resolver 2 serving as a rotation sensor that outputs three-phase voltage signals Va, Vb, and Vc corresponding to the rotational angle of a rotary shaft 1 and a controller 3 for detecting the rotational angle of the rotary shaft 1 based on the signals Va to Vc output from the resolver 2. In the case described herein, the multiplication factor for the angle of the resolver 2 is set to 1.

The resolver 2 is configured by a rotor 20, which is formed by a magnetic body that rotates integrally with the rotary shaft 1, and a stator 21, which is spaced from the rotor 20 at a predetermined interval. The stator 21 has an excitation coil 22, a first resolver coil 23, a second resolver coil 24, and a third resolver coil 25. The first to third resolver coils 23 to 25 are spaced apart each at an interval of 120° in an electric angle phase about the rotational center O of the rotor 20 in a circumferential direction (the direction indicated by arrow R1 in FIG. 12). Corresponding ends of the resolver coils 23 to 25 are electrically connected together. The other ends of the resolver coils 23 to 25 are electrically connected to corresponding output terminals Ta, Tb, Tc through associated signal lines 23a, 24a, 25a. The excitation coil 22 receives AC voltage from an oscillating circuit 4, which is mounted in the rotational angle detection apparatus, to generate an alternating magnetic field. In the resolver 2, an alternating magnetic field generated by the excitation coil 22 is provided to the first to third resolver coils 23 to 25 through the rotor 20. This induces the voltages (a1), (a2), and (a3) described below each having amplitude varied in a sinusoidal manner with respect to the rotational angle (the electric angle) $\theta e$ of the rotor 20 in the first to third resolvers 23, 24, and 25, respectively, through electromagnetic induction. In this case, the oscillating circuit 4 supplies AC voltage Vr (Vr=E×sin($\omega$t)) to the excitation coil 22 (E represents the amplitude, $\omega$ represents the angular frequency, and t represents the time). Further, K represents the transformation ratio.

(a1) Voltage Va (Va=K×E×sin($\theta e$)×sin($\omega$t)) is induced in the first resolver coil 23.

(a2) Voltage Vb (Vb=K×E×sin($\theta e$+120°)×sin($\omega$t)) is induced in the second resolver coil 24.

(a3) Voltage Vc (Vc=K×E×sin($\theta e$+240°)×sin($\omega$t)) is induced in the third resolver coil 25.

The voltages Va to Vc, which are induced in the first to third resolver coils 23 to 25, are output from the corresponding output terminals Ta to Tc of the resolver 2 and received by the controller 3.

The controller 3 performs signal processing to extract amplitude components from the signals Va to Vc output from the resolver 2. The controller 3 thus obtains an amplitude value Sa (Sa=K×E×sin($\theta e$)) from the output signal Va, an amplitude value Sb (Sb=K×E×sin($\theta e$+120°)) from the output signal Vb, and an amplitude value Sc (Sc=K×E×sin($\theta e$+240°)) from the output signal Vc. FIG. 13 is a graph representing the relationship between the output signal amplitude values Sa to Sc and the mechanical angle $\theta$ of the rotor 20 in which the output signal amplitude values Sa to Sc are plotted along the axis of the ordinate and the mechanical angle $\theta$ is plotted along the axis of the abscissas. FIG. 13 illustrates a case in which the multiplication factor of angle of the resolver 2 is set to four times (4×), the electric potential difference Vpp (Vpp=2×E) between the peaks of the AC voltage Vr provided to the excitation coil 22 is set to 4[V], and the transformation ratio K is set to 0.2.

The controller 3 calculates the electric angle $\theta e$ of the rotor 20 in three different manners using the expressions (1) to (3) described below, from the output signal amplitude values Se to Sc varied in the manners illustrated in FIG. 13. The electric angles calculated using the expressions (1), (2), and (3) are represented as the electric angles $\theta e1$, $\theta e2$, and $\theta e3$, respectively. Each of the expressions (1) to (3) transforms the corresponding one of the output signal amplitude values Sa to Sc to the relationship between the sine value and the cosine value and obtains the electric angle of the rotor 20 from the arc sine value of the output signal amplitude value Se to Sc.

$$\theta e1 = \tan^{-1}((\sqrt{3} \times Sa)/-2 \times Sb - Sa)) \tag{1}$$

$$\theta e2 = \tan^{-1}((\sqrt{3} \times Sb)/(-2 \times Sc - Sb)) - 120° \tag{2}$$

$$\theta e3 = \tan^{-1}((\sqrt{3} \times Sc)/(-2 \times Sa - Sc)) - 240° \tag{3}$$

FIG. 14 is a graph representing the relationship between the electric angles $\theta e1$ to $\theta e3$ of the rotor 20, which are calculated using the corresponding expressions (1) to (3), and the mechanical angle $\theta$ of the rotor 20 in which the electric angles $\theta e1$ to $\theta e3$ are plotted along the axis of the ordinate and the mechanical angle $\theta$ is plotted along the axis of the abscissas. Normally, the electric angles $\theta e1$ to $\theta e3$ change while being equal to each other. The controller 3 detects the electric angles $\theta e1$ to $\theta e3$ of the rotor 20, which are, in other words, the electric angle of the rotary shaft 1, in this manner.

In the rotational angle detection apparatus, the signals Va to Vc output by the resolver 2 have non-normal values when the apparatus has a malfunction such as a break in the wiring system of any one of the first to third resolver coils 23 to 25, a power fault, in which a wire contacts a power supply line, or a ground fault, in which a wire contacts a grounding wire. This hampers appropriate detection of the electric angles $\theta e1$ to $\theta e3$ of the rotor 20. Accordingly, if a malfunction such as a break in the wiring system in any of the first to third resolver coils 23 to 25 occurs, it is demanded that the malfunction be detected appropriately.

To meet this demand, as described in, for example, Japanese Laid-Open Patent Publication No. 2006-138778, a conventional rotational angle detection apparatus detects the aforementioned malfunction based on the sum of squares of the output signal amplitude values Sa, Sb, Sc. Specifically, the sum of squares S of the output signal amplitude values Sa to Sc is determined as indicated by the expression (4) described below.

$$S = Va^2 + Vb^2 + Vc^2 \quad (4)$$

$$= (K + Vpp/2)^2 \times ((\sin(\theta e))^2 + (\sin(\theta e + 120°))^2 + (\sin(\theta e + 240°))^2)$$

Specifically, the relationship among the values $\sin(\theta e)$, $\sin(\theta e+120°)$, and $\sin(\theta e+240°)$ is represented by the expression (5) described below.

$$(\sin(\theta e))^2 + (\sin(\theta e+120°))^2 + (\sin(\theta e+240°))^2 = 1.5 \quad (5)$$

Accordingly, the sum of squares S is a fixed value represented by the expression (6) described below.

$$S = 1.5 \times (K \times Vpp/2)^2 \quad (6)$$

As a result, if the electric potential difference between the peaks of the AC voltage Vr supplied to the excitation coil 22 is set to 4[V] and the transformation ratio is set to 0.2, for example, the sum of squares S is 0.24.

Specifically, the expression (6) is an ideal expression. That is, the sum of squares S is varied actually by various types of errors such as a detection error or a computation error. Accordingly, the controller 3 sets an upper limit threshold value greater than the theoretical value (0.24) and a lower limit threshold value smaller than the theoretical value. If the sum of squares S is either greater than or equal to the upper limit threshold value or smaller than or equal to the lower limit threshold value, the controller 3 determines that a malfunction such as a break has occurred in the wiring system of a resolver coil. In this manner, the malfunction is detected simply by comparing the sum of squares S of the output signals Va to Vc of the resolver 2 with the threshold values. This facilitates detection of a malfunction.

Malfunctions that occur in the wiring systems of the resolver coils 23 to 25 include, for example, a short circuit in the signal lines 23a to 25a corresponding to the resolver coils 23 to 25, in addition to the aforementioned break or ground fault. When a short circuit happens in any one of the signal lines 23a to 25a, it is difficult to detect the short circuit based on the sum of squares S of the output signal amplitude values Sa to Sc, as will be described in detail. Specifically, with reference to FIGS. 12, 15, and 16, the electric angle of the rotor 20 detected through the controller 3 at the time when a short circuit occurs in any signal line 23a to 25a will be described.

For example, as indicated by the double-dashed lines in FIG. 12, a short circuit may occur between the signal line 23a corresponding to the first resolver coil 23 and the signal line 24a corresponding to the second resolver coil 24. In this case, each one of the signals Va, Vb output from the corresponding output terminals Ta, Tb of the resolver 2 represents the average of the voltage induced in the corresponding one of the first and second resolver coils 23, 24. The waveforms of the output signal amplitude values Sa, Sb, which are detected by the controller 3, thus change from the shapes illustrated in FIG. 13 to the shapes illustrated in FIG. 15. In this state, the electric angles θe1 to θe3 of the rotor 20, which are determined by the controller 3 using the expressions (1) to (3), represent the values shown in FIG. 16. In other words, the calculated electric angles θe1 to θe3 represent either 30° or 210° and are greatly different from the actual electric angle of the rotor 20. FIG. 17A is a graph representing the relationship between the electric angle error Δθd and the rotor mechanical angle θ in which the electric angle error Δθd is plotted along the axis of the ordinate and the rotor mechanical angle θ is plotted along the axis of the abscissas. The electric angle error Δθd is obtained by subtracting the calculated electric angle θe1 at the time of a short circuit in the signal line represented in FIG. 16 from the calculated electric angle θe1 in a normal state represented in FIG. 14. Referring to FIG. 17A, a great error in the range of −90° to 90° is generated between the electric angle of the rotor 20 calculated at the time of a short circuit and the actual electric angle of the rotor 20.

When the output signal amplitude values Sa to Sc vary in the manner represented in FIG. 15, the sum of squares S of the output signal amplitude values Sa to Sc vary in a sinusoidal manner with respect to the mechanical angle θ of the rotor 20 as represented in FIG. 17B. Specifically, in this case, the lower threshold value Smin of the sum of squares S is set to (0.1176 (0.1176=0.24×0.72)) with respect to the theoretical value (0.24) and the upper threshold value of the sum of squares S is set to (0.4056 (0.4056=0.24×1.32)). FIG. 17B does not include the upper threshold value for the illustrative purposes. In this case, referring to FIG. 17C, the controller 3 is allowed to detect a malfunction when the sum of squares S is smaller than or equal to the lower limit threshold value Smin but cannot detect a malfunction if the sum of squares S is greater than the lower limit threshold value Smin. Accordingly, when the electric angles θe1 to θe3 of the rotor 20 are calculated in the rotational angle range A1 to A9 of the rotor 20 in which the sum of squares S exceeds the lower limit threshold value Smin, the controller 3 detects the calculated electric angles θe1 to θe3 as normal electric angles. As a result, an error between the electric angle of the rotor 20 that is erroneously detected by the controller 3 and the actual electric angle of the rotor 20 represents the values illustrated in FIG. 17D. If actuation of an electric motor is controlled based on an electric angle with such a great error in, for example, a power steering apparatus, behavior of the electric motor may disadvantageously change to a great extent.

This problem is not restricted to resolvers but commonly noted for a rotation sensor that outputs three-phase signals corresponding to the rotational angle of a rotor from three magnetic field change detecting sections, which are spaced apart in a circumferential direction of the rotor.

SUMMARY OF THE INVENTION

Accordingly, it is an objective of the present invention to provide a rotation sensor and a rotational angle detection apparatus that are capable of detecting a short circuit malfunction in a signal line further appropriately.

To achieve the foregoing objective and in accordance with a first aspect of the present invention, a rotation sensor is provided that includes a rotor having a rotational center, first to third magnetic field change detecting sections, and a magnetic field generating section. The first to third magnetic field change detecting sections are arranged spaced apart in a circumferential direction of the rotor. The magnetic field generating section generates a magnetic field provided to the first to third magnetic field change detecting sections. The magnetic field provided from the magnetic field generating section to the first to third magnetic field change detecting sections changes as the rotor rotates. The first to third magnetic field change detecting sections output three-phase signals that change in correspondence with the rotational angle of the rotor. When the angular intervals between the corresponding adjacent pairs of the first to third magnetic field change detecting sections about the rotational center of the rotor in the circumferential direction of the rotor are defined as first, second, and third division angles, the first to third magnetic field change detecting sections are arranged in such a manner that the first to third division angles are different from one another.

In accordance with a second aspect of the present invention, a rotational angle detection apparatus is provided that detects the electric angle of a rotor based on three-phase signals output from a rotation sensor. The rotation sensor includes a rotor having a rotational center, first to third magnetic field change detecting sections, and a magnetic field generating section. The first to third magnetic field change detecting sections are arranged spaced apart in a circumferential direction of the rotor. The magnetic field generating section generates a magnetic field provided to the first to third magnetic field change detecting sections. The magnetic field provided from the magnetic field generating section to the first to third magnetic field change detecting sections changes as the rotor rotates. The first to third magnetic field change detecting sections output three-phase signals that change in correspondence with the rotational angle of the rotor. When the angular intervals between the corresponding adjacent pairs of the first to third magnetic field change detecting sections about the rotational center of the rotor in the circumferential direction of the rotor are defined as first, second, and third division angles, the first to third magnetic field change detecting sections are arranged in such a manner that the first to third division angles are different from one another. The rotational angle detecting apparatus includes a controller that calculates first, second, and third calculated electric angles each representing a rotor electric angle, using the three-phase signals output from the rotation sensor and detects a malfunction in the rotation sensor based on the difference between any two of the first to third calculated electric angles.

In accordance with a third aspect of the present invention, a resolver is provided that includes three resolver coils arranged spaced apart in a circumferential direction of a rotor and an excitation coil that generates a magnetic field to induce voltages in the three resolver coils when receiving electric power. When, as the rotor rotates, the voltages induced in the three resolver coils are changed through change in the magnetic field provided from the excitation coil to each of the three resolver coils, the resolver outputs three-phase signals having amplitude that changes in a sinusoidal manner with respect to the rotational angle of the rotor. When the angular intervals between the corresponding adjacent pairs of the three resolver coils about the rotational center of the rotor in the circumferential direction of the rotor are defined as first, second, and third division angles, the three resolver coils are arranged in such a manner that the first to third division angles are different from one another.

In accordance with a fourth aspect of the present invention, a rotation sensor is provided that includes a rotor having a rotational center, first to third magnetism detecting sections, and a magnetic field generating section. The first to third magnetism detecting sections are arranged spaced apart in a circumferential direction of the rotor. The magnetic field generating section generates a magnetic field provided to the first to third magnetism detecting sections. The magnetic field provided from the magnetic field generating section to the first to third magnetism detecting sections changes as the rotor rotates, and the first to third magnetism detecting sections output three-phase signals that change in correspondence with the rotational angle of the rotor. When the angular intervals between the corresponding adjacent pairs of the first to third magnetism detecting sections about the rotational center of the rotor in the circumferential direction of the rotor are defined as first, second, and third division angles, the first to third magnetism detecting sections are arranged in such a manner that the first to third division angles are different from one another.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 12:
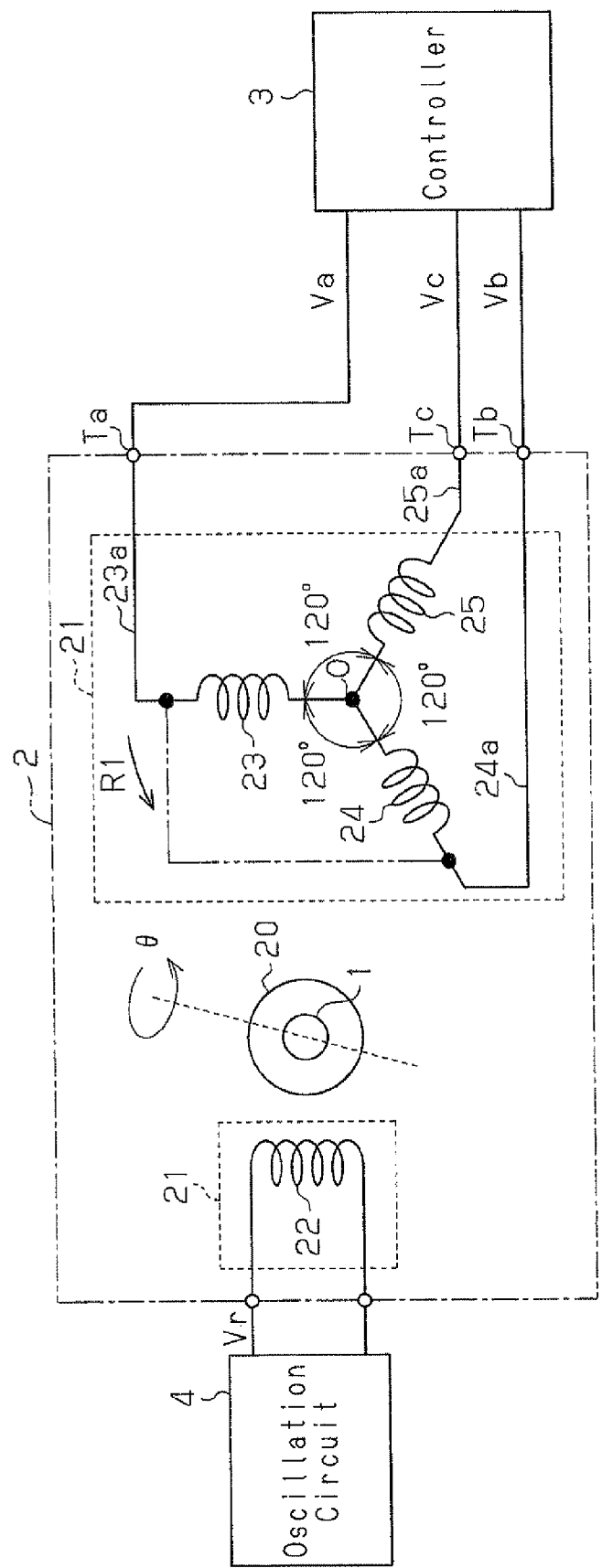
FIG. 12 is a block diagram schematically representing the configuration of a conventional rotational angle detection apparatus.
Figure 13:
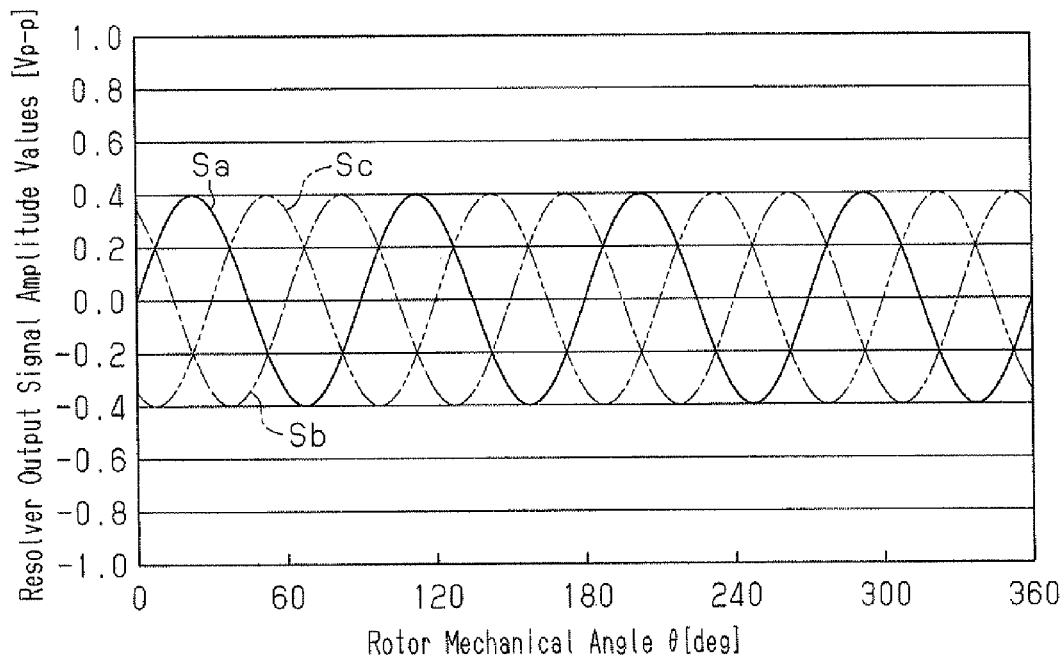
FIG. 13 is a graph representing resolver output signal amplitude values calculated by the rotational angle detection apparatus of FIG. 12 and the rotor mechanical angle.
Figure 14:
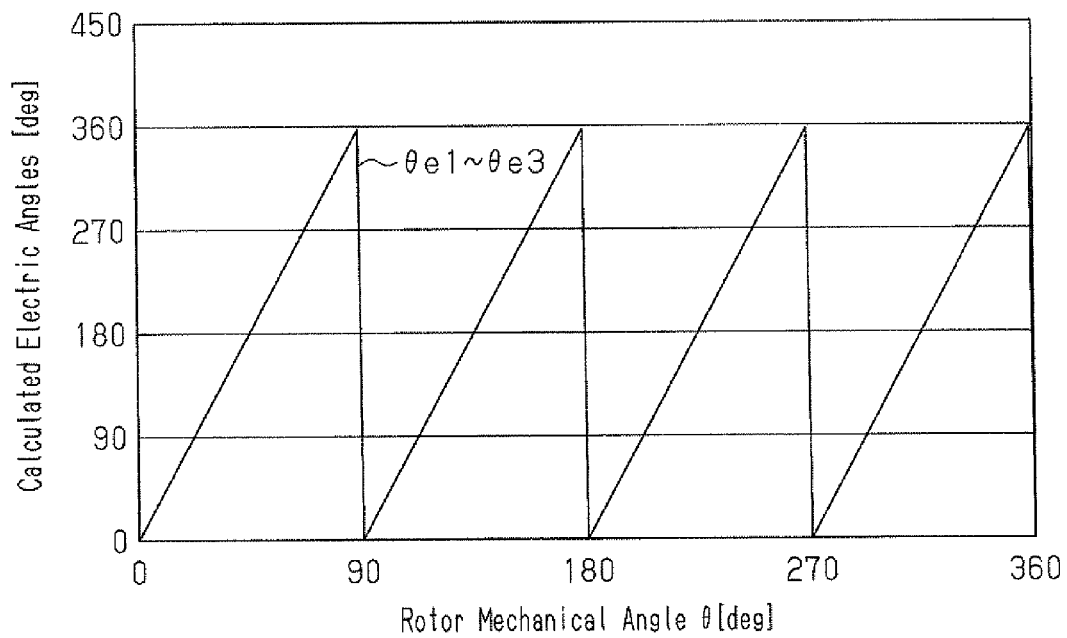
FIG. 14 is a graph representing the relationship between three rotor electric angles calculated by the rotational angle detection apparatus of FIG. 12 and the rotor mechanical angle.
Figure 15:
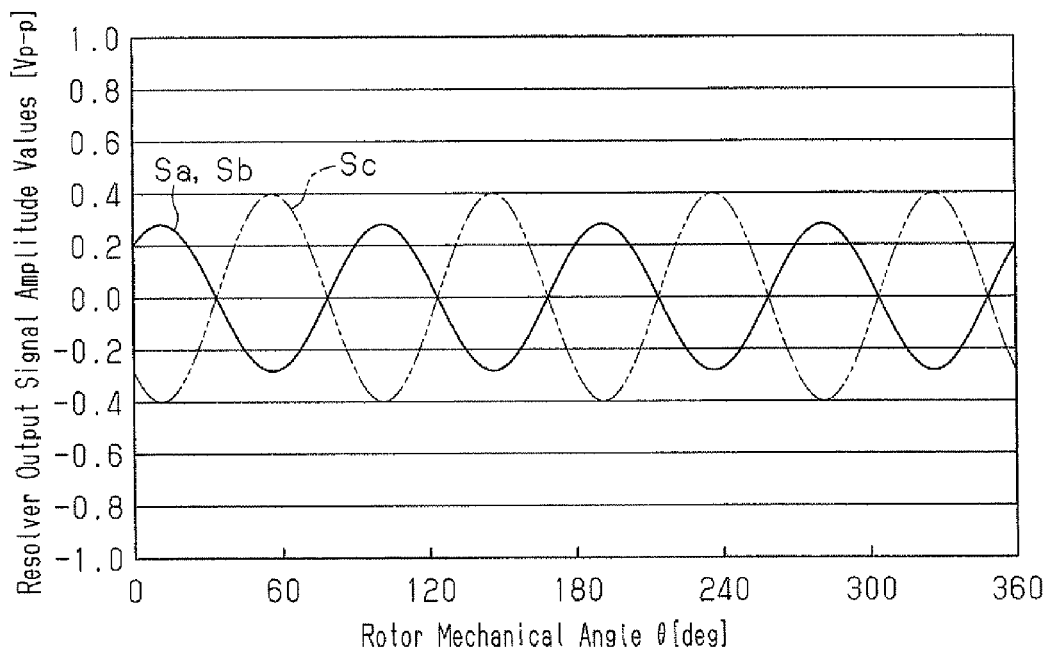
FIG. 15 is a graph representing the relationship between resolver output signal amplitude values calculated by the rotational angle detection apparatus of FIG. 12 at the time of a short circuit in a resolver signal line and the rotor mechanical angle.

A rotational angle detection apparatus according to one embodiment of the present invention will now be described with reference to FIGS. 1 to 9. The rotational angle detection apparatus of the illustrated embodiment detects the rotational angle of a rotary shaft such as a steering shaft for a vehicle. The schematic configuration of the rotational angle detection apparatus will first be described referring to FIG. 1. The rotational angle detection apparatus illustrated in FIG. 1 has a configuration for detecting the rotational angle of the rotary shaft 1 that is identical with the corresponding configuration in the conventional rotational angle detection apparatus illustrated in FIG. 12. That is, the rotational angle detection apparatus of the illustrated embodiment also detects the rotational angle of the rotor 20 based on the three-phase signals Va to Vc output from the resolver 2 in correspondence with the rotational angle of the rotary shaft 1. Operation of the rotational angle detection apparatus of the embodiment is basically the same as the operation that has been described with reference to FIG. 12. Further, also for the illustrated embodiment, the multiplication factor of angle of the resolver 2 is set to one time, which is 1×). Same or like reference numerals are given to components in FIG. 1 that are the same as or like corresponding components in FIG. 12 and repeated description of these components is omitted herein.

Figure 1:
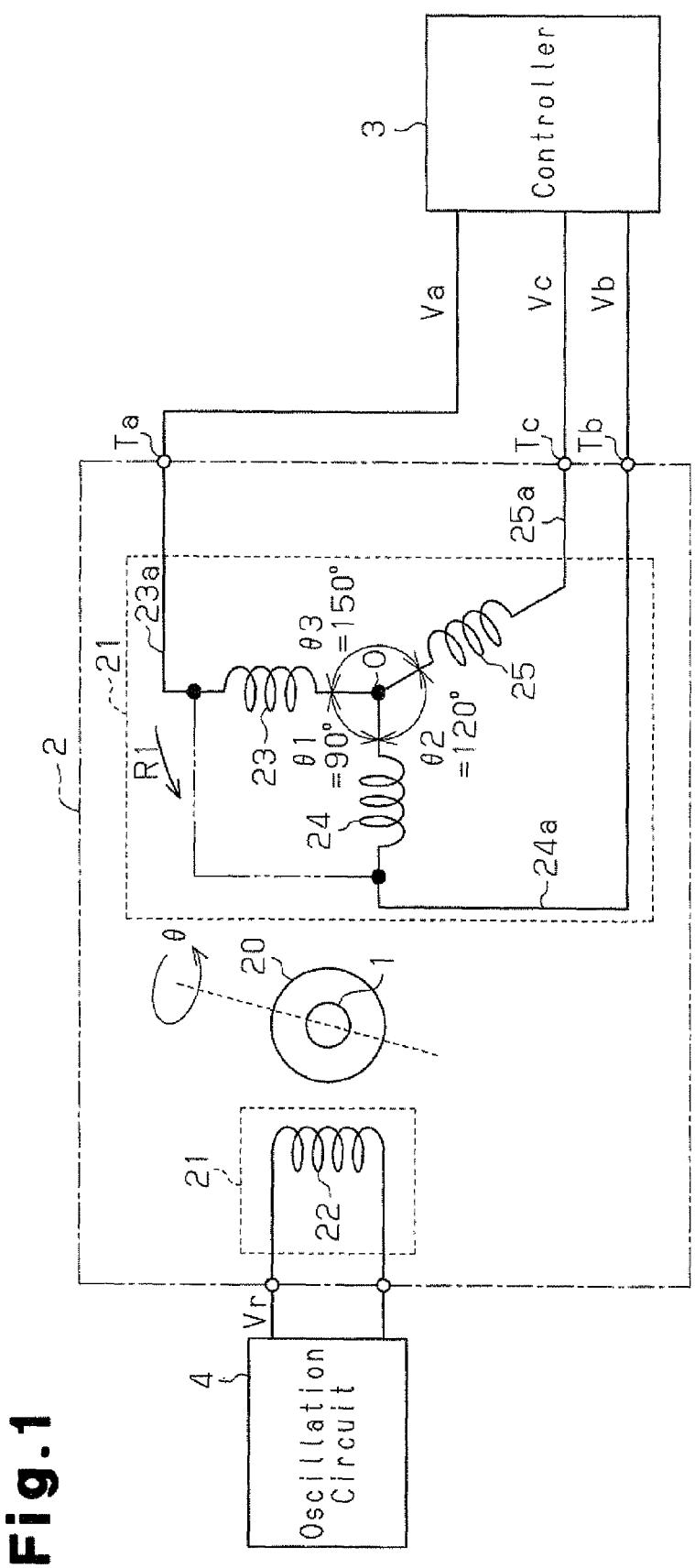
FIG. 1 is a block diagram schematically representing the configuration of a rotational angle detection apparatus according to one embodiment of the present invention.

As illustrated in FIG. 1, the second resolver coil 24 is arranged at the position displaced from the first resolver coil 23 by 90° in the electric angle phase in a circumferential direction of the rotor 20 (indicated by arrow R1 in FIG. 1) about the rotational center ○ of the rotor 20. The third resolver coil 25 is arranged at the position displaced from the first resolver coil 23 by 210° in the electric angle phase in the circumferential direction R1 about the rotational center ○ of the rotor 20. In this manner, the phase differences in the electric angle between the corresponding adjacent pairs of the first to third resolver coils 23 to 25 are defined as a first division angle θ1, a second division angle θ2, and a third division angle θ3 in the circumferential direction R1 of the rotor 20. The first division angle θ1, the second division angle θ2, and the third division angle θ3 are set to 90°, 120°, and 150°, respectively. As has been described, the first to third resolver coils 23 to 25 are arranged in such a manner that the first to third division angles θ1 to θ3 become different from one another.

In the resolver 2, an alternating magnetic flux produced by the excitation coil 22 is provided to the first to third resolver coils 23 to 25, each serving as a magnetic field change detecting section, through the rotor 20. This induces the voltages (b1), (b2), and (b3) described below in the first to third resolver coils 23 to 25 in correspondence with the electric angle θ of the rotor 20 through electromagnetic induction. Specifically, in this case, AC voltage Vr (Vr=E×sin(ωt)) is supplied from the oscillating circuit 4 to the excitation coil 22 (E represents the amplitude, ω represents the angular frequency, and t represents the time). Further, K represents the transformation ratio between the excitation coil 22 and each of the resolver coils 23 to 25.

(b1) Voltage Va (Va=K×E×sin(θe)×sin(ωt)) is induced in the first resolver coil 23.
(b2) Voltage Vb (Vb=K×E×sin(θe+90°)×sin(ωt)) is induced in the second resolver coil 24.
(b3) Voltage Vc (Vc=K×E×sin(θe+210°)×sin(ωt)) is induced in the third resolver coil 25.

Figure 2:
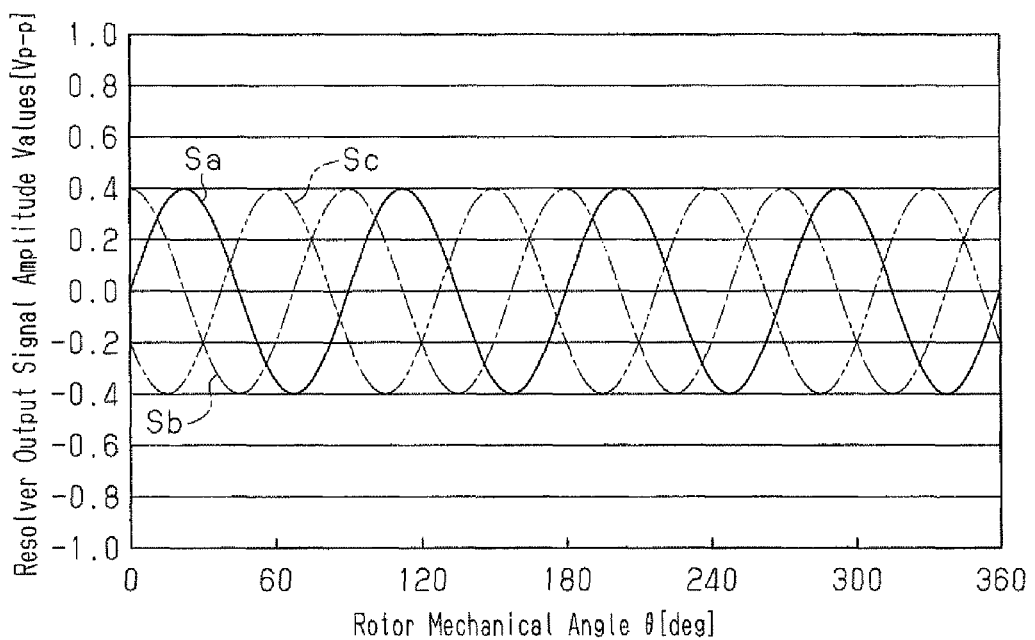
FIG. 2 is a graph representing the relationship between resolver output signal amplitude values calculated by the rotational angle detection apparatus of FIG. 1 and a rotor mechanical angle.

The controller 3 performs signal processing to extract amplitude components from the signals Va to Vc output from the resolver 2. The controller 3 thus obtains an amplitude value Sa (Sa=K×E×sin(θe)) from the output signal Va, an amplitude value Sb (Sb=K×E×sin(θe+90°)) from the output signal Vb, and an amplitude value Sc (Sc=K×E×sin(θe+210°)) from the output signal Vc. FIG. 2 is a graph representing the relationship between the output signal amplitude values Sa to Sc and the mechanical angle θ of the rotor 20 in which the output signal amplitude values Sa to Sc are plotted along the axis of the ordinate and the mechanical angle θ is plotted along the axis of the abscissas. FIG. 2 illustrates a case in which the multiplication factor of angle of the resolver 2 is set to four times (4×), the electric potential difference Vpp (Vpp=2×E) between the peaks of the AC voltage Vr provided to the excitation coil 22 is set to 4[V], and the transformation ratio K is set to 0.2. The controller 3 calculates the electric angle θe of the rotor 20 in three different manners using the expressions (7) to (9) described below, from the output signal amplitude values Sa to Sc varying in the manners illustrated in FIG. 2. The electric angles calculated using the expressions (7), (8), and (9) are defined as the electric angles θe1, θe2, and θe3, respectively. Each of the expressions (7) to (9) transforms the corresponding one of the output signal amplitude values Sa to Sc to the relationship between the sine value and the cosine value and obtains the electric angle of the rotor 20 from the arc sine value of the output signal amplitude value Se to Sc.

$$\theta e1 = \tan^{-1}(Sa/Sb) \quad (7)$$

$$\theta e2 = \tan^{-1}((Sb/2+Sc)/(-Sb\times\sqrt{3}/2)) - 90° \quad (8)$$

$$\theta e3 = \tan^{-1}((-Sa/2)/(Sc+Sa\times\sqrt{3}/2)) - 210° \quad (9)$$

Figure 3:
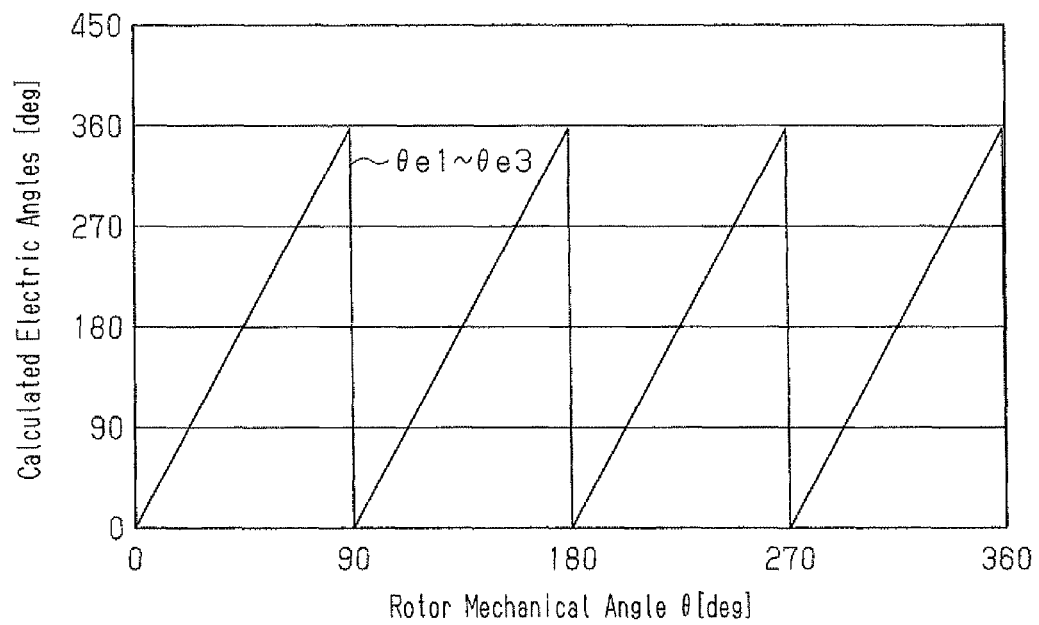
FIG. 3 is a graph representing the relationship between three rotor electric angles calculated by the rotational angle detection apparatus of FIG. 1 and the rotor mechanical angle.
Figure 4:
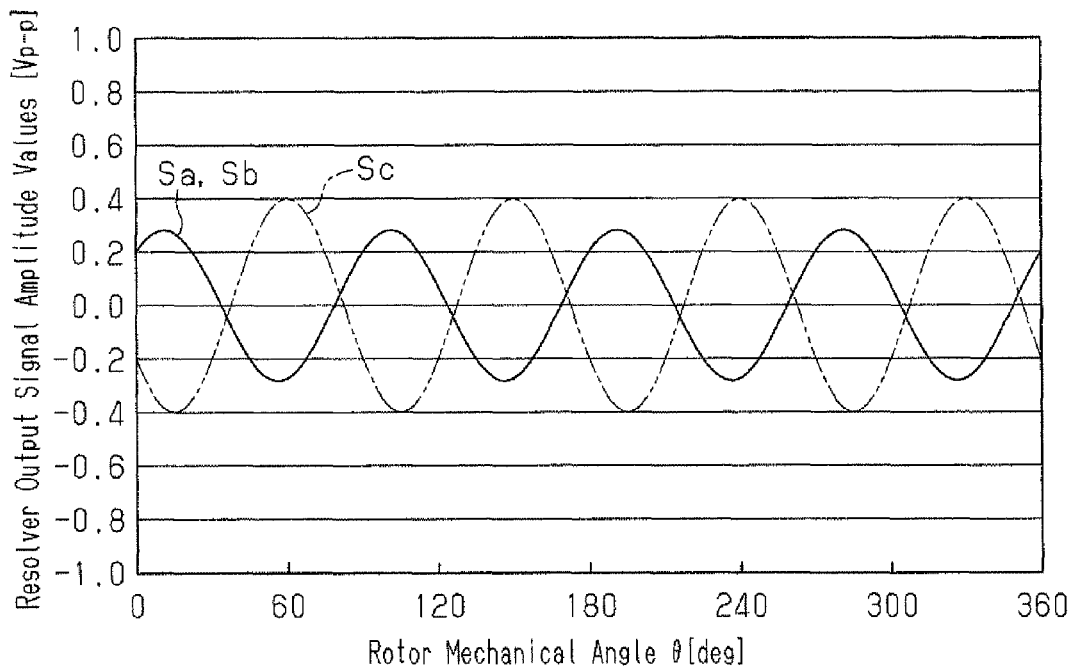
FIG. 4 is a graph representing the relationship between resolver output signal amplitude values calculated by the rotational angle detection apparatus of FIG. 1 at the time of a short circuit in a resolver signal line and the rotor mechanical angle.

FIG. 3 is a graph representing the relationship between the electric angles θe1 to θe3 of the rotor 20, which are calculated using the corresponding expressions (7) to (9), and the mechanical angle θ of the rotor 20 in which the electric angles θe1 to θe3 are plotted along the axis of the ordinate and the mechanical angle θ is plotted along the axis of the abscissas. As is clear from the graph, also in the rotational angle detection apparatus of the illustrated embodiment, the calculated electric angles θe1 to θe3 are normally maintained as equal angles, as in the case of the rotational angle detection apparatus illustrated in FIG. 12.

The inventor of the present invention has found out that, when the first to third resolver coils 23 to 25 are arranged in the manner illustrated in FIG. 1 and a short circuit occurs between any two of the signal lines 23a to 25a corresponding to the resolver coils 23 to 25, the calculated electric angles θe1 to θe3 tend to become mutually different values. The fact that has been found out by the inventor will hereafter be described with reference to FIGS. 4 and 5.

Figure 5:
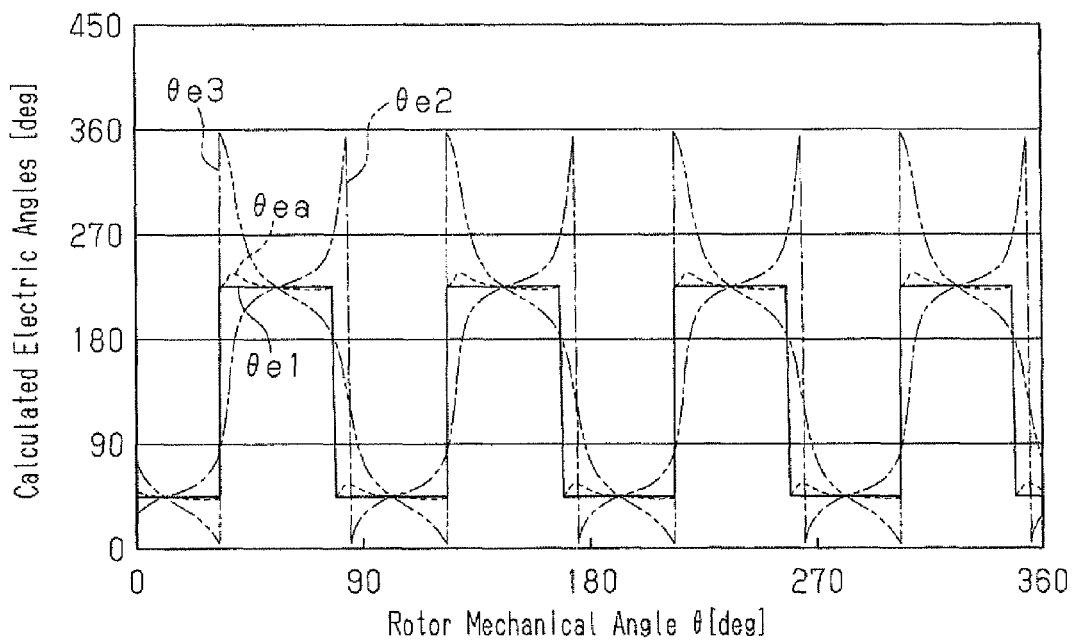
FIG. 5 is a graph representing the relationship between three rotor electric angles calculated by the rotational angle detection apparatus of FIG. 1 at the time of a short circuit in a resolver signal line and the rotor mechanical angle.

For example, as indicated by the double-dashed lines in FIG. 1, a short circuit may occur between the signal line 23a corresponding to the first resolver coil 23 and the signal line 24a corresponding to the second resolver coil 24. In this case, the waveforms of the output signal amplitude values Sa, Sb change from the shapes illustrated in FIG. 2 to the shapes illustrated in FIG. 4. In this state, the electric angles θe1 to θe3 calculated by the controller 3 using the expressions (7) to (9) vary with respect to the mechanical angle θ of the rotor 20 in the manners represented in FIG. 5. In FIG. 5, the solid lines represent the calculated electric angle θe1 and the single-dashed lines represent the calculated electric angle θe2. The double-dashed lines represent the calculated electric angle θe3 and the broken lines represent the average θea of the calculated electric angles θe1 to θe3. As is clear from comparison between FIG. 5 and FIG. 3, when a short circuit occurs between the signal line 23a and the signal line 24a, the calculated electric angles θe1 to θe3 become different from one another.

Accordingly, in the illustrated embodiment, a short circuit malfunction in a signal line of the resolver 2 is detected based on the difference between any two of the calculated electric angles θe1 to θe3. Specifically, the controller 3 calculates absolute values |Δθe1|, |Δθe2|, and |Δθe3| of corresponding electric angle differences Δθe1, Δθe2, 2and Δθe3, as will be described in the items (c1), (c2), and (c3), respectively.

(c1) The absolute value |Δθe1| of the difference Δθe1 (Δθe1=θe1−θe2) between the calculated electric angles θe1 and θe2.

(c2) The absolute value |Δθe2| of the difference Δθe2 (Δθe2=θe2−θe3) between the calculated electric angles θe2 and θe3.

(c3) The absolute value |Δθe3| of the difference Δθe3 (Δθe3=θe3−θe1) between the calculated electric angles θe3 and θe1.

When any one of the calculated absolute values |Δθe1| to |Δθe3| exceeds a predetermined malfunction determining threshold value θth (θth>0), the controller 3 determines that a short circuit malfunction has occurred in a signal line of the resolver 2.

The controller 3 detects a short circuit malfunction in a signal line of the resolver 2 in the manner described below with reference to FIG. 6. In the case described herein, the malfunction determining threshold value θth is set to 5°.

Figure 6A:
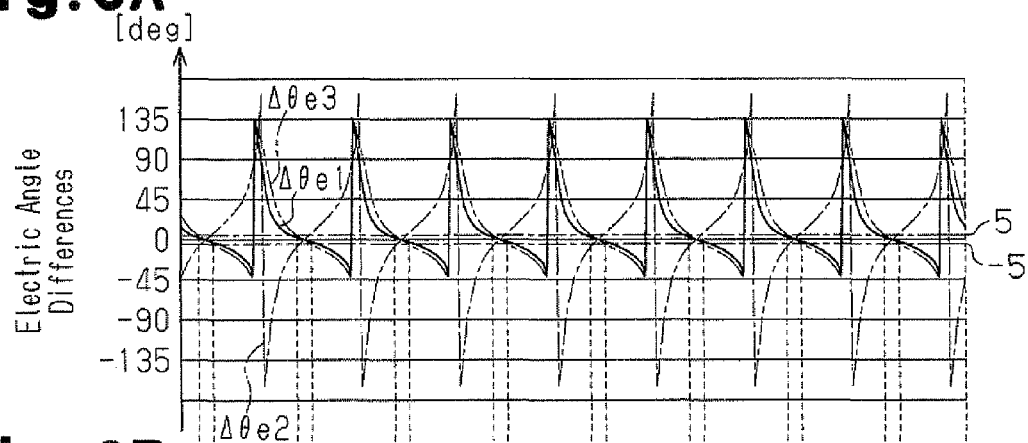
FIGS. 6A, 6B, 6C, and 6D are timing charts each representing an example of operation of the rotational angle detection apparatus of FIG. 1.
Figure 6B:
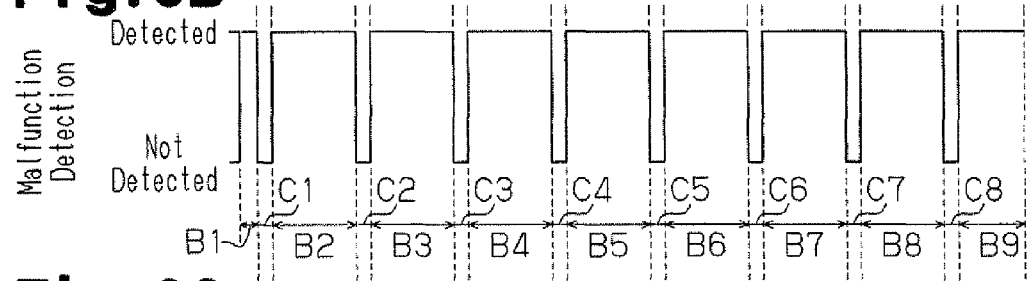

For example, as a short circuit occurs in a signal line of the resolver 2, the calculated electric angles θe1 to θe3 start to vary as represented in FIG. 5. In this state, the electric angle differences Δθe1 to Δθe3, which are calculated by the controller 3, vary in the manner represented in FIG. 6A with respect to the mechanical angle θ of the rotor 20. In FIG. 6A, the solid lines represent the electric angle difference Δθe1, the single-dashed lines represent the electric angle difference Δθe2, and the double-dashed lines represent the electric angle difference Δθe3. When any one of the electric angle differences Δθe1 to Δθe3 is either greater than 5° or smaller than −5°, the controller 3 detects a short circuit malfunction in a signal line of the resolver 2. As a result, as represented in FIG. 6B, the short circuit malfunction in the signal line of the resolver 2 is detected when the rotational angle θ of the rotor 20 is in each of the angular ranges B1 to B9. This ensures further appropriate detection of a malfunction by the controller 3.

Figure 6C:
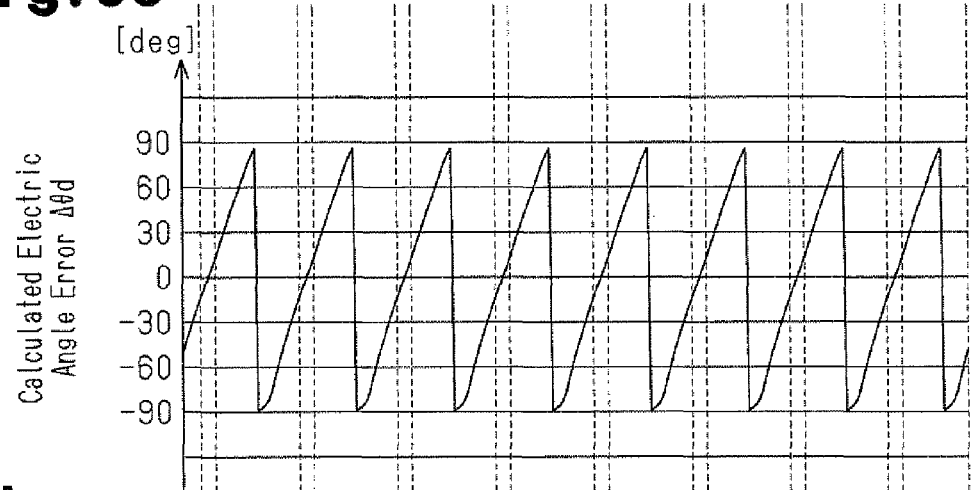
Figure 6D:
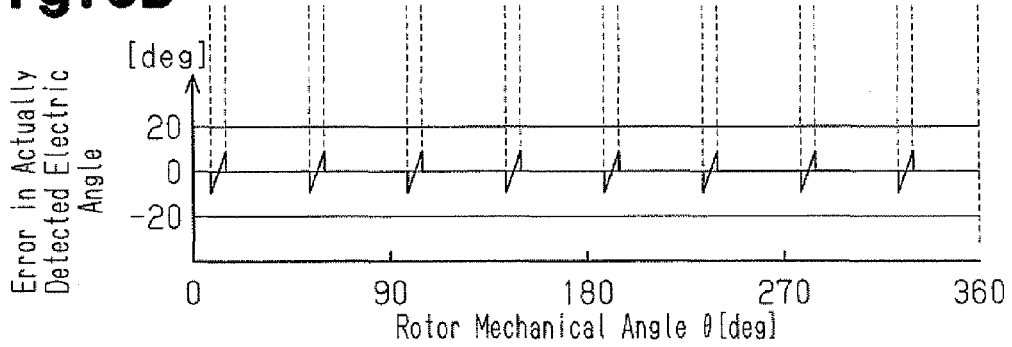
Figure 17A:
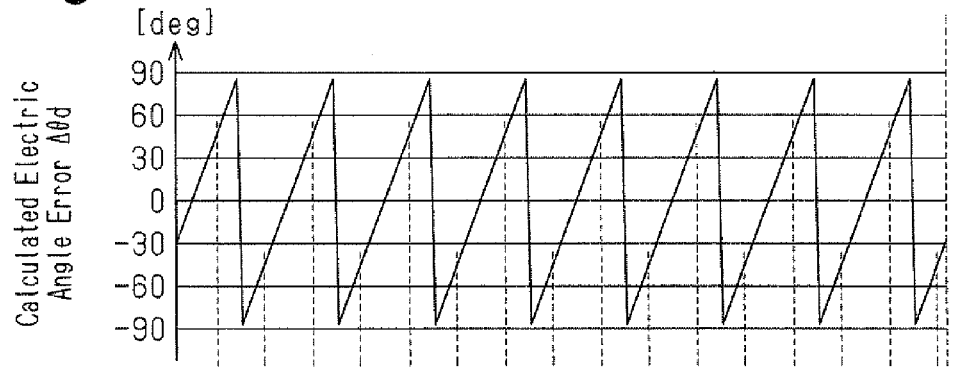
FIGS. 17A, 17B, 17C, and 17D are timing charts each representing an example of operation of the rotational angle detection apparatus of FIG. 12.
Figure 17B:
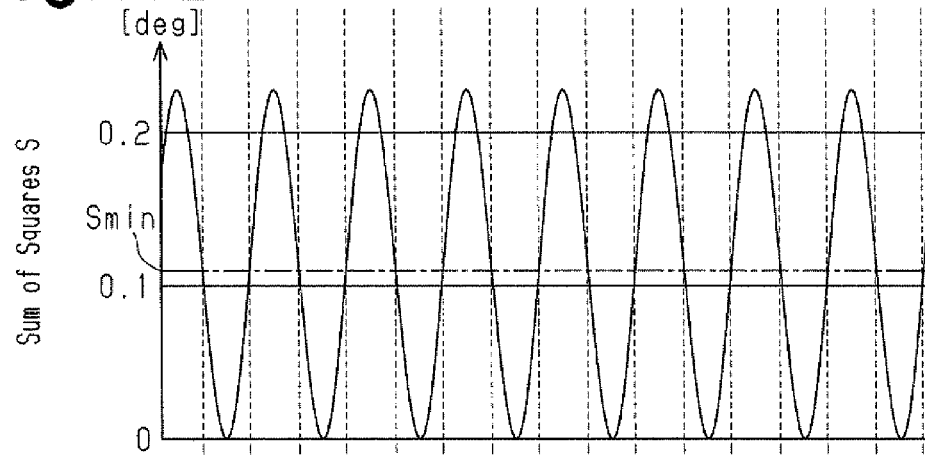
Figure 17C:
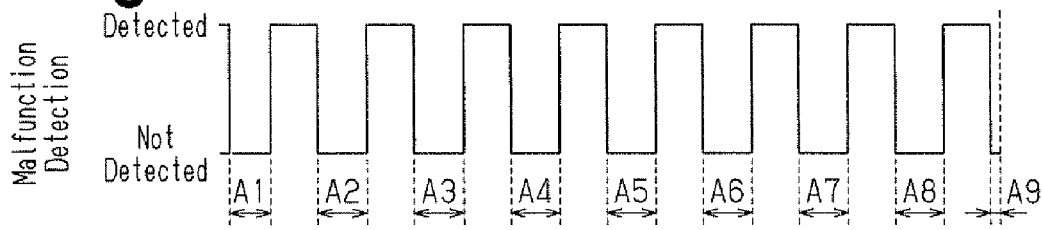
Figure 17D:
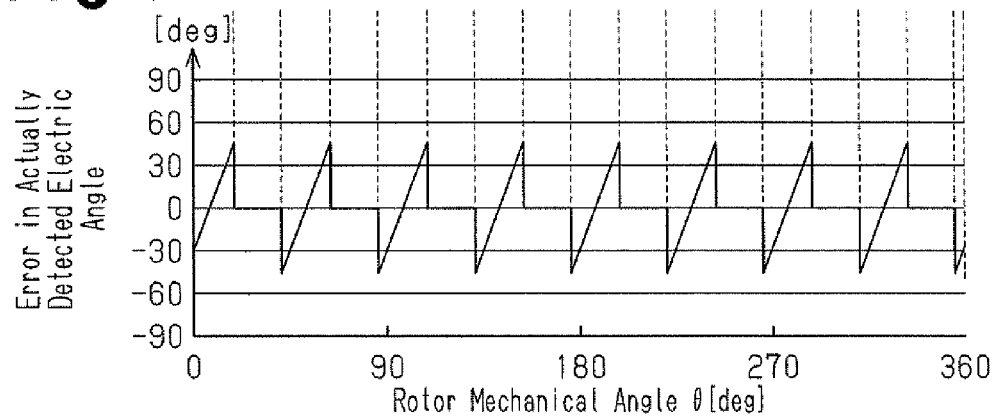

FIG. 6C is a graph representing change of the electric angle error Δθd, which is obtained by subtracting the average θea of the calculated electric angles θe1 to θe3 at the time of a malfunction represented in FIG. 5, from the calculated electric angle θe1 in a normal state represented in FIG. 3. Specifically, the controller 3 is allowed to detect a short circuit malfunction in a signal line of the resolver 2 when the rotational angle of the rotor 20 falls in any one of the angular ranges B1 to B9. Accordingly, actual erroneous detection of an electric angle including an error occurs when the rotational angle θ of the rotor 20 is outside the angular ranges B1 to B9, or, in other words, in any of the angular ranges C1 to C8 illustrated in FIG. 6B. As a result, the error between the electric angle of the rotor 20 erroneously detected by the controller 3 and the actual electric angle of the rotor 20 varies in the manner represented in FIG. 6D. As is clear from comparison between FIG. 6D and FIG. 17D, the rotational angle detection apparatus of the illustrated embodiment reduces the error between the electric angle of the rotor 20 erroneously detected by the controller 3 and the actual electric angle. This effect is advantageous in an apparatus that controls operation of an electric motor based on the electric angle of the rotor 20 detected through a rotational angle detection apparatus, such as a power steering apparatus for a vehicle. That is, since an electric angle of the rotor 20 erroneously detected through the rotational angle detection apparatus includes only a small error, behavior of the electric motor is prevented from changing greatly even if a short circuit malfunction occurs in a signal line of the resolver 2.

The controller 3 is capable of detecting a malfunction also when a short circuit occurs, for example, between the signal line 24a corresponding to the second resolver coil 24 and the signal line 25a corresponding to the third resolver coil 25 or between the signal line 25a corresponding to the third resolver coil 25 and the signal line 23a corresponding to the first resolver coil 23.

Simulation analyses conducted by the inventor have demonstrated that performance of the controller 3 for detecting a malfunction is improved by adjusting the division angles of the three resolver coils, as will be described in detail with reference to FIGS. 7 to 9. In FIGS. 7 and 8, the phase difference in the electric angle between the position of a first resolver coil (a first magnetic field change detecting section) 50 and a second resolver coil (a second magnetic field change detecting section) 51 about the rotational center O in the circumferential direction R1 is represented by the angular interval θa. Also, the phase difference in the electric angle between the position of the first resolver coil (the first magnetic field change detecting section) 50 and a third resolver coil (a third magnetic field change detecting section) 52 about the rotational center O in the circumferential direction R1 is represented by the angular interval θb.

Figure 7A:
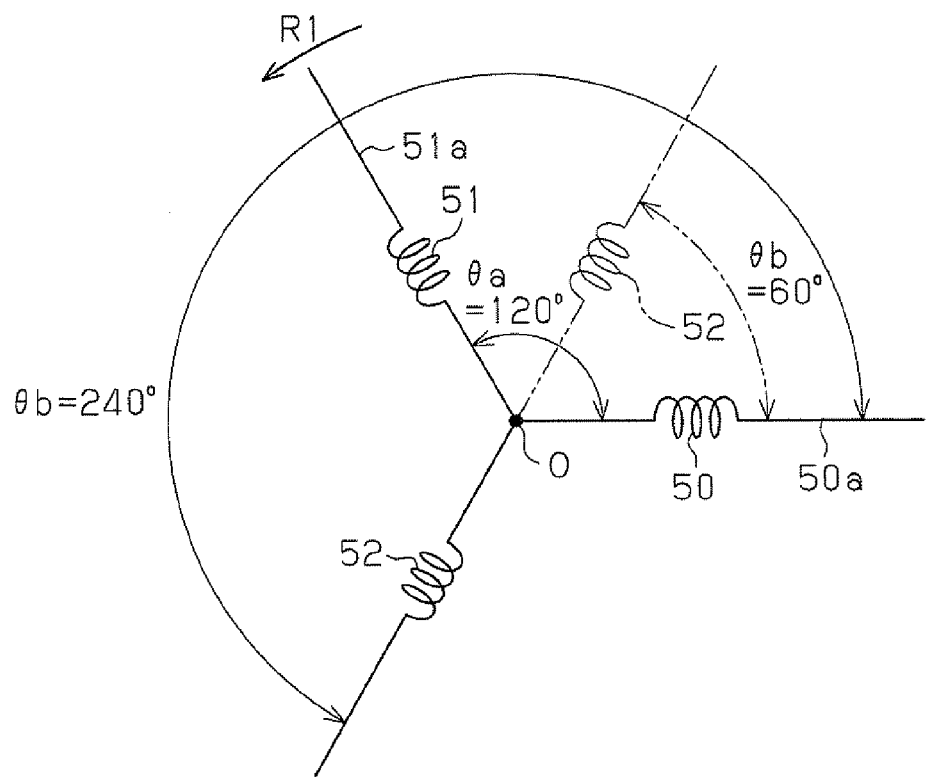
FIGS. 7A and 7B are views each schematically representing an example of arrangement of resolver coils in the rotational angle detection apparatus of FIG. 1 that cannot detect a short circuit malfunction in a resolver signal line.
Figure 8:
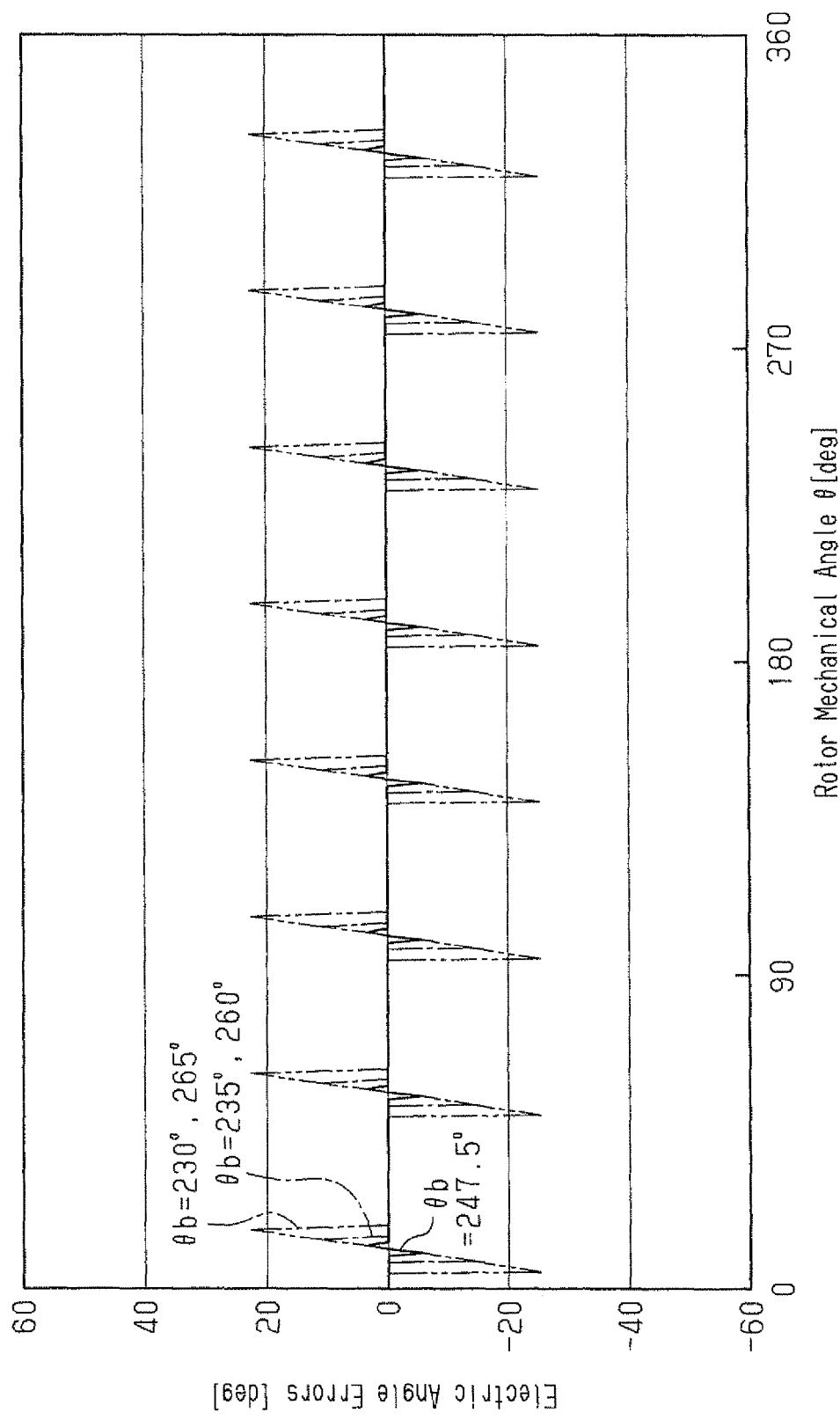
FIG. 8 is a graph representing the relationship between the error between a rotor electric angle erroneously detected by the rotational angle detection apparatus of FIG. 1 and the actual rotor electric angle and the rotor mechanical angle.
Figure 16:
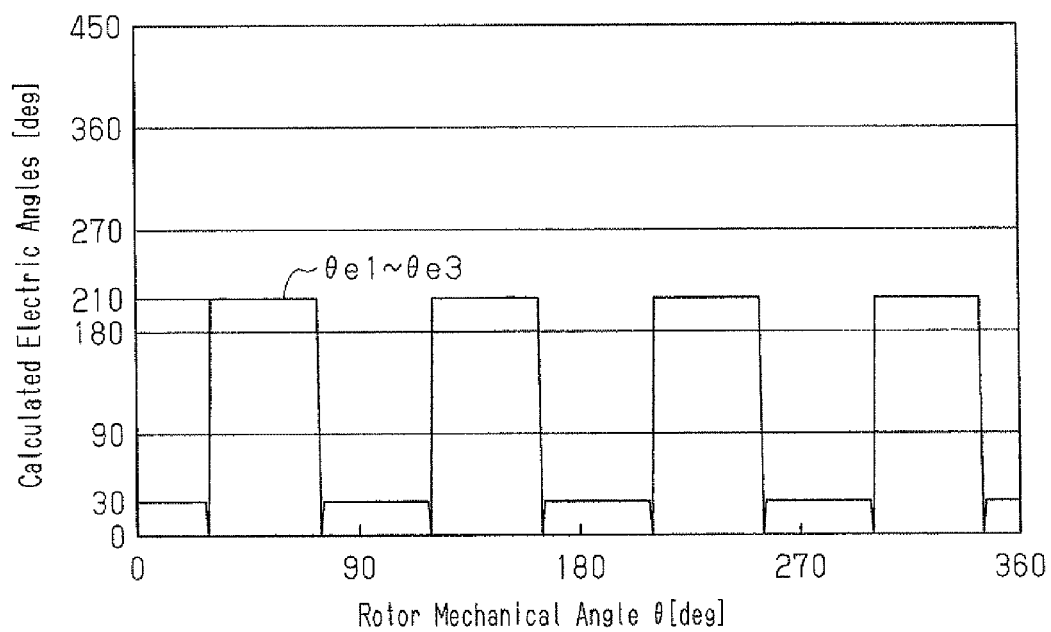
FIG. 16 is a graph representing the relationship between three rotor electric angles calculated by the rotational angle detection apparatus of FIG. 12 at the time of a short circuit in a resolver signal line and the rotor mechanical angle.

Referring to FIG. 7A, the angular interval θa of the second resolver coil 51 is set to 120° and the angular interval θb of a third resolver coil 52 is set to 240°. In this case, the first to third resolver coils 50 to 52 are arranged in the same manner as the resolver coils of the resolver 2 illustrated in FIG. 12. Accordingly, when a short circuit occurs between a signal line 50a corresponding to the first resolver coil 50 and a signal line 51a corresponding to the second resolver coil 51, the electric angles θe1 to θe3 of the rotor 20 calculated by the controller 3 become the values represented in FIG. 16. In other words, the calculated electric angles θe1 to θe3 become all equal. As a result, the electric angle differences Δθe1 to Δθe3 between the corresponding two of the electric angles θe1 to θe3 are constantly 0. This makes it impossible to detect a malfunction through comparison between the above-described absolute values |Δθe1| to |Δθe3| of the electric angle differences Δθe1 to Δθe3 and the malfunction determining threshold value θth.

The calculated angles θe1 to θe3 become equal when a short circuit occurs between the signal lines 50a and 51a also in the cases (d1), (d2), and (d3), as described below.

(d1) The case in which, with the angular interval θa of the second resolver coil 51 set to 120° as illustrated in FIG. 7A, the angular interval θb of the third resolver coil 52 is set to 60° as represented by the double-dashed lines in the drawing.

Figure 7B:
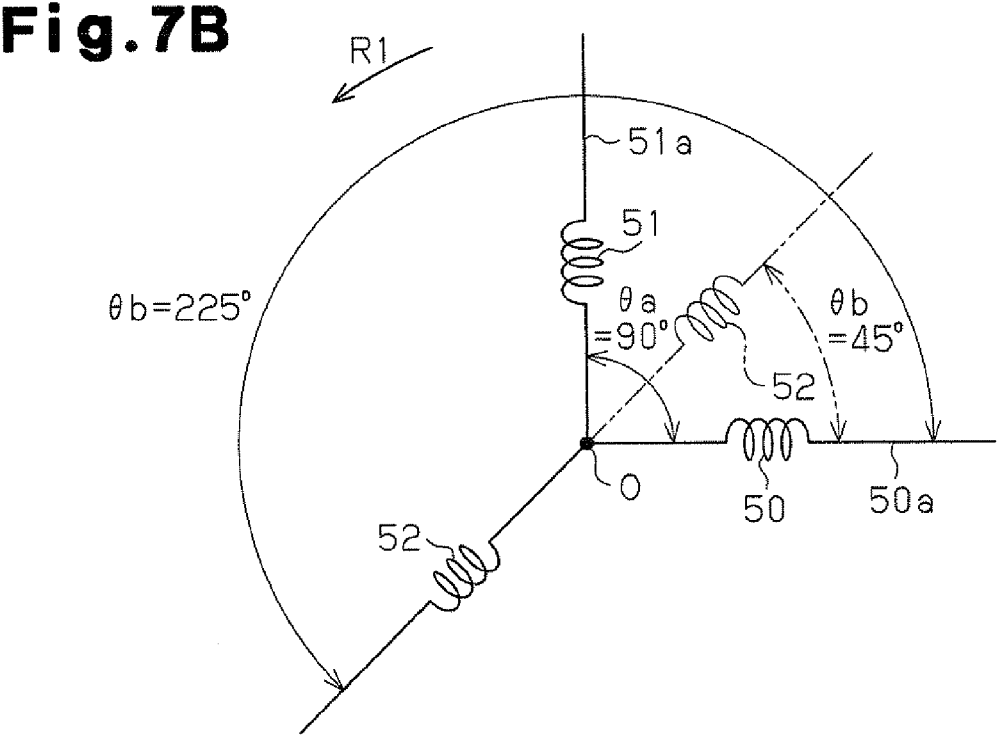

(d2) The case in which the angular interval θa of the second resolver coil 51 is set to 90° and the angular interval θb of the third resolver coil 52 is set to 225° as represented in FIG. 7B.

(d3) The case in which, with the angular interval θa of the second resolver coil 51 set to 90° as illustrated in FIG. 7B, the angular interval θb of the third resolver coil 52 is set to 45° as represented by the double-dashed lines in the drawing.

According to the simulation analyses conducted by the inventor, including the analyses of the aforementioned cases, the calculated electric angles θe1 to θe3 become equal when the angular intervals θa, θb of the second resolver coils 51, 52 satisfy the expression (10) or the expression (11), which will be described below. In these cases, it has been found out that the controller 3 is prevented from detecting a malfunction.

$$\theta b = \theta a/2 \quad (10)$$

$$\theta b = \theta a/2 + 180° \quad (11)$$

The simulation analyses conducted by the inventor have also found out that, when the angular interval θa of the second resolver coil 51 is set to 90° as illustrated in FIG. 7B and the angular interval θb of the third resolver coil 52 is increased gradually from 225°, the manner in which the controller 3 detects a malfunction is changed as represented in FIG. 8. FIG. 8 corresponds to FIG. 6D and is a graph representing the relationship between the error between the rotor electric angle erroneously detected by the controller 3 and the actual rotor electric angle and the mechanical angle θ of the rotor 20, in which the error is plotted along the axis of the ordinate and the mechanical angle θ is plotted along the axis of the abscissas. Referring to FIG. 8, the angular range of the rotor 20 in which the electric angle is erroneously detected becomes narrower as the angular interval θb of the third resolver coil 52 becomes greater from 225° and is minimized when the angular interval θb of the third resolver coil 52 is 247.5°. Also, the angular range of the rotor 20 in which the electric angle is erroneously detected becomes wider as the angular interval θb of the third resolver coil 52 becomes greater from 247.5°. Accordingly, when the angular interval θb of the third resolver coil 52 is set to 247.5°, the angular range of the rotor 20 in which the electric angle is erroneously detected is minimized. In other words, performance of the rotational angle detection apparatus for detecting a malfunction is maximally enhanced. Further, according to the simulation analyses conducted by the inventor, including the above-described simulation analyses, it has been found out that the performance of the rotational angle detection apparatus for detecting a malfunction is maximally improved when the angular intervals θa, θb of the second and third resolver coils 51, 52 satisfy any one of the expressions (12), (13), (14), and (15), which will be described below.

$$\theta b = \theta a \times (\frac{1}{4}) \quad (12)$$

$$\theta b = \theta a \times (\frac{1}{4}) + 180° \quad (13)$$

$$\theta b = \theta a \times (\frac{3}{4}) \quad (14)$$

$$\theta b = \theta a \times (\frac{3}{4}) + 180° \quad (15)$$

Figure 9A:
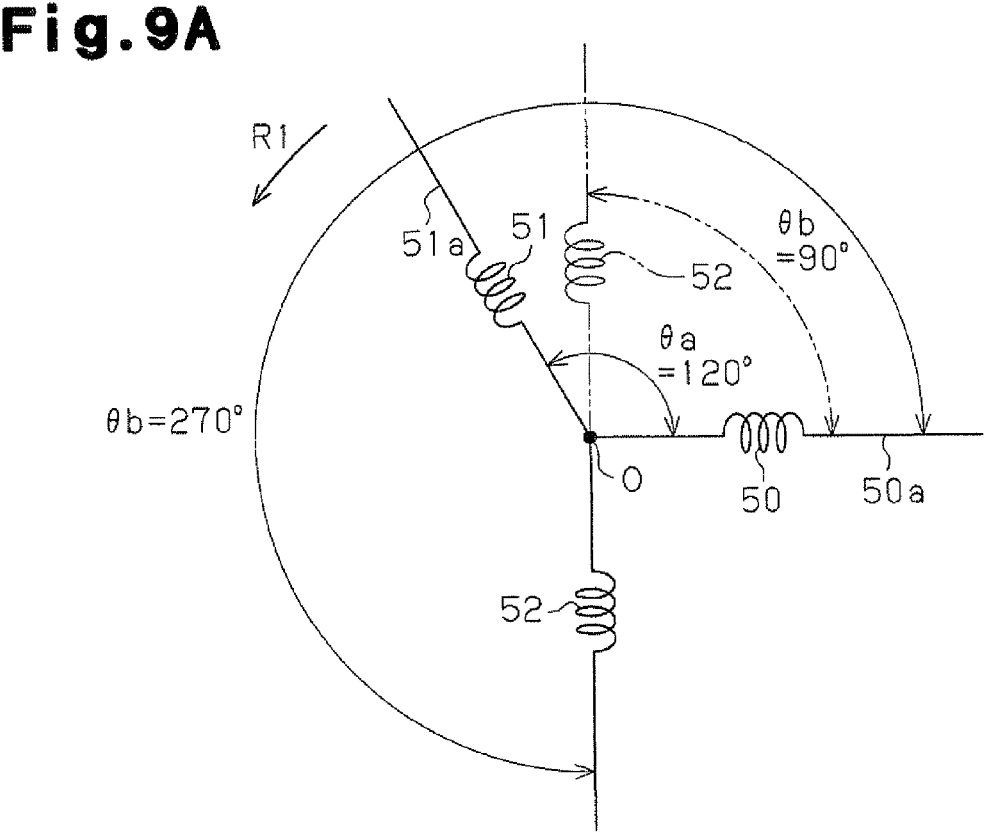
FIGS. 9A and 9B are views each schematically representing an example of arrangement of resolver coils in the rotational angle detection apparatus of FIG. 1 that maximally improves detection accuracy for a short circuit malfunction in a resolver signal line.
Figure 9B:
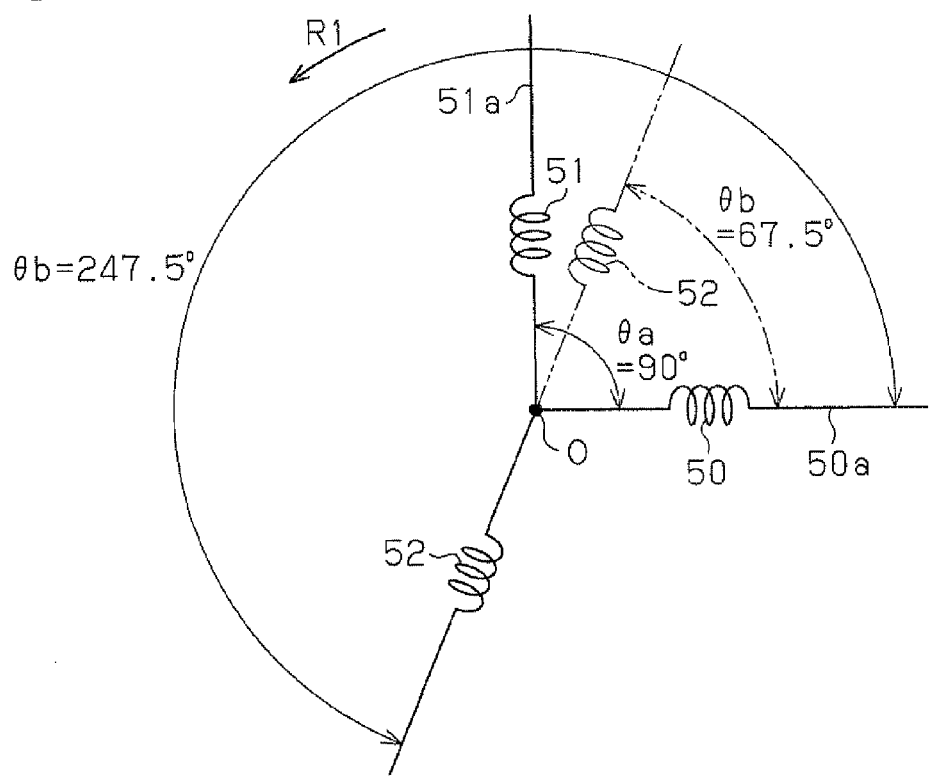

Specifically, when the angular interval θa of the second resolver coil 51 is set to 120° as illustrated in FIG. 9A, the performance of the rotational angle detection apparatus for detecting a malfunction is maximally improved by setting the angular interval θb of the third resolver coil 52 to either 90° or 270°. Also in this case, although not illustrated, the performance of the rotational angle detection apparatus for detecting a malfunction is maximally enhanced by setting the angular interval θb of the third resolver coil 52 to either 30° or 210°. Contrastingly, when the angular interval θa of the second resolver coil 51 is set to 90° as illustrated in FIG. 9B, the performance of the rotational angle detection apparatus for detecting a malfunction is maximally improved by setting the angular interval θb of the third resolver coil 52 to either 67.5° or 247.5°. Also in this case, although not illustrated, the performance of the rotational angle detection apparatus for detecting a malfunction is maximally enhanced by setting the angular interval θb of the third resolver coil 52 to either 22.5° or 202.5°. Further, in the resolver 2 illustrated in FIG. 1, the second resolver coil 24, the third resolver coil 25, and the first resolver coil 23 are arranged at the positions of the first resolver coil 50, the second resolver coil 51, and the third resolver coil 52, respectively, in FIG. 9A. In other words, the rotational angle detection apparatus illustrated in FIG. 1 also has the maximally improved performance for detecting a malfunction.

Further, as illustrated in FIG. 9A, by setting the angular interval θa of the second resolver coil 51 to 120° and the angular interval θb of the third resolver coil 52 to 270°, the three resolver coils 50 to 52 are arranged separately in the circumferential direction R1 of the rotor 20. This decreases influence by disturbance such as magnetic noise on the first to third resolver coils 50 to 52. Resistance of the resolver 2 to the disturbance is thus improved.

As has been described, the resolver and the rotational angle detection apparatus of the illustrated embodiment have the advantages described below.

(1) As illustrated in FIG. 1, the division angles θ1, θ2, and θ3 of the corresponding first, second, and third resolver coils 23, 24, and 25 are set to 90°, 120°, and 150°, respectively. In other words, as illustrated in FIG. 9A, the angular interval θa between the position of the first resolver coil 50 and the position of the second resolver coil 51 in the circumferential direction R1 of the rotor 20 is set to 120°. Also, the angular interval θb between the position of the first resolver coil 50 and the position of the third resolver coil 52 in the circumferential direction R1 of the rotor 20 is set to 270°. This arrangement ensures further appropriate detection of a malfunction when a short circuit occurs between any two of the signal lines 23a to 25a. Also, influence by disturbance such as magnetic noise on the first to third resolver coils 23 to 25 is reduced. This increases resistance of the resolver 2 to the disturbance.

(2) A short circuit malfunction in a signal line of the resolver 2 is detected based on the electric angle differences Δθe1 to Δθe3, each of which is determined from the difference between the corresponding two of the electric angles θe1 to θe3 of the rotor 20 calculated using the corresponding expressions (7) to (9). In this manner, a short circuit malfunction in a signal line of the resolver 2 is detected simply by calculating the differences. This decreases computation load on the controller 3.

The illustrated embodiment may be modified to the forms described below.

In the illustrated embodiment, a short circuit malfunction in a signal line of the resolver 2 is detected based on the electric angle differences Δθe1 to Δθe3, each of which is determined from the difference between the corresponding two of the calculated electric angles θe1 to θe3. Instead, a short circuit malfunction in a signal line of the resolver 2 may be detected based on, for example, the difference between the average θea of the calculated electric angles θe1 to θe3 and each of the calculated electric angles δe1 to θe3. In other words, detection of a short circuit malfunction may be performed in any suitable manner as long as detection of the malfunction is ensured when it is detected that the calculated electric angles θe1 to θe3 vary in the manners represented in FIG. 5.

In the illustrated embodiment, the division angles θ1, θ2, and θ3 of the first, second, and third resolver coils 23, 24, and 25 are set to 90°, 120°, and 150°, respectively. The division angles θ1 to θ3 may be changed as needed as long as the angles θ1 to θ3 are different from one another. However, to improve performance of the rotational angle detection apparatus for detecting a malfunction, it is desirable to arrange the three resolver coils in such a manner as to satisfy the expressions (12) to (15).

Figure 10:
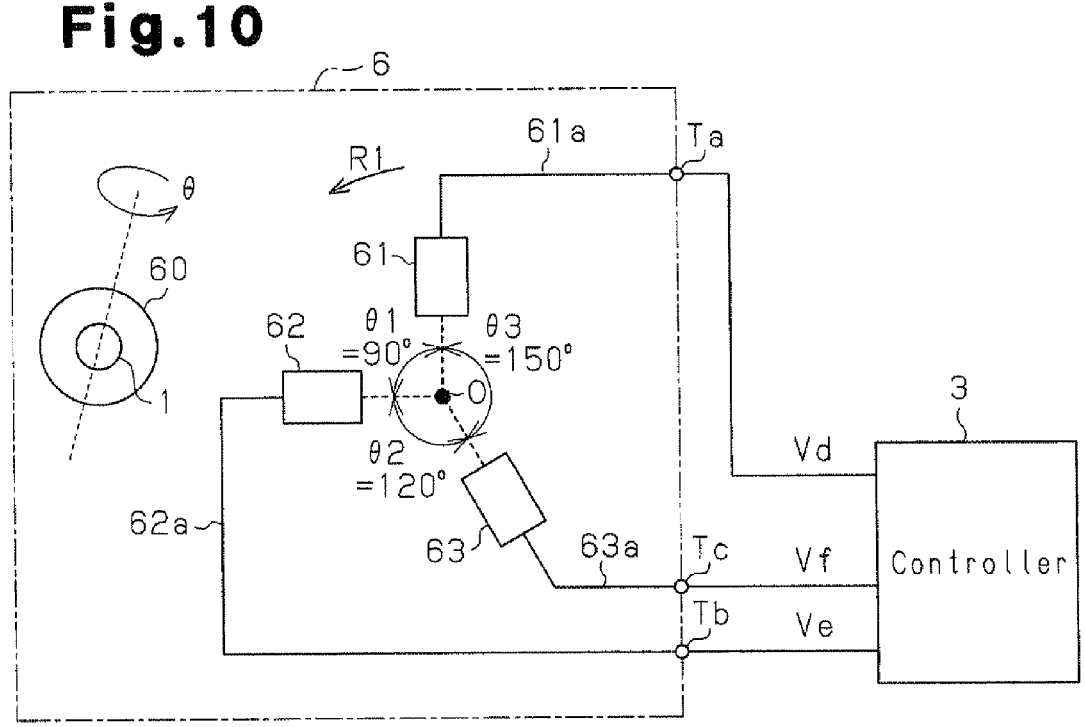
FIG. 10 is a block diagram schematically representing the configuration of a rotational angle detection apparatus employing a rotation sensor according to the present invention.
Figure 11:
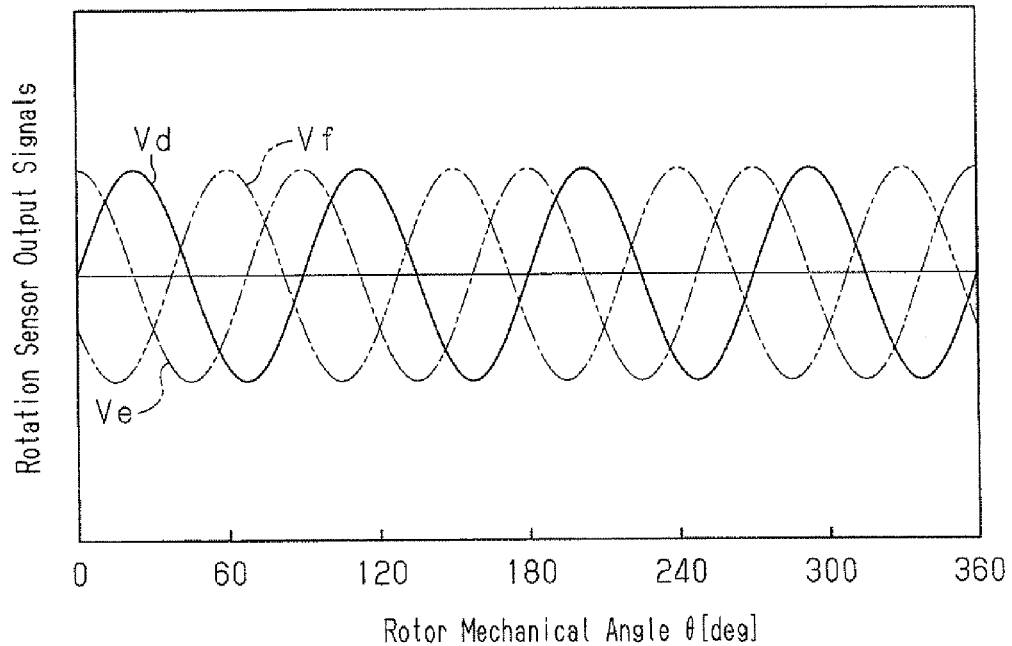
FIG. 11 is a graph representing the relationship between three-phase signals output by the rotation sensor of FIG. 10 and the rotor mechanical angle.

The present invention is usable in a rotation sensor that detects rotation of a rotor using a magnetism detecting section such as a Hall element or a magnetic resistance element. FIG. 10 shows one example of the rotation sensor. Referring to FIG. 10, the rotation sensor 6 has a rotor 60 formed by a permanent magnet and three magnetism detecting sections 61, 62, and 63, which are spaced apart in the circumferential direction R1 of the rotor 60. In this case, the rotor 60 is a magnetic field generating section. As the rotor 60 rotates to change the magnetic field provided from the rotor 60 to the magnetism detecting sections 61 to 63, the magnetism detecting sections 61 to 63 output signals that change in a sinusoidal manner with respect to the rotor rotational angle (the rotor electric angle) θ. The signals output from the magnetism detecting sections 61 to 63 are sent to the controller 3 through signal lines 61a, 61b, 61c and corresponding terminals Ta, Tb, Tc. In the rotation sensor 6, the division angles θ1, θ2, and θ3 of the corresponding magnetism detecting sections 61, 62, and 63 are set to 90°, 120°, and 150°, respectively, as in the case of the illustrated embodiment. This causes output signals Vd, Ve, Vf of the rotation sensor 6 to vary in the manners represented in FIG. 11. In other words, the output signals Vd to Vf vary with respect to the mechanical angle θ of the rotor 60 in the same manners as the output signal amplitude values Sa to Sc illustrated in FIG. 2. Accordingly, using a malfunction detecting method similar to that of the illustrated embodiment, the controller 3 detects a short circuit malfunction in a signal line of the rotation sensor 6 using the output signals Vd to Vf. That is, the rotation sensor according to the present invention is usable as a rotation sensor that detects rotation of a rotor using any suitable magnetic field change detecting section such as a resolver coil or a Hall element or a magnetic resistance element.

In the illustrated embodiment, the multiplication factor of angle of the resolver 2 is set to one time 1× or four times 4×. However, the multiplication factor of angle of the resolver 2 is not restricted to any particular value.

The rotational angle detection apparatus according to the present invention is used as not only an apparatus for detecting the rotational angle of a vehicle steering shaft but also an apparatus for detecting the rotational angle of any suitable rotary shaft.

Therefore, the present examples and embodiments are to be considered as illustrative and not restrictive and the invention is not to be limited to the details given herein, but may be modified within the scope and equivalence of the appended claims.

The invention claimed is:

1. A rotation sensor comprising:
   a rotor having a rotational center;
   first, second, and third magnetic field change detecting sections that are arranged spaced apart in a circumferential direction of the rotor; and
   a magnetic field generating section that generates a magnetic field provided to the first to third magnetic field change detecting sections, wherein
   the magnetic field provided from the magnetic field generating section to the first to third magnetic field change detecting sections changes as the rotor rotates, and the first to third magnetic field change detecting sections output three-phase signals that change in correspondence with the rotational angle of the rotor, and
   when the angular intervals between the corresponding adjacent pairs of the first to third magnetic field change detecting sections about the rotational center of the rotor in the circumferential direction of the rotor are defined as first, second, and third division angles, the first to third magnetic field change detecting sections are arranged in such a manner that the first to third division angles are different from one another.

2. The rotation sensor according to claim 1, wherein, when the angular interval in the electric angle phase of the rotor between the position of the first magnetic field change detecting section and the position of the second magnetic field change detecting section in the circumferential direction of the rotor is defined as a value θa, and the angular interval in the electric angle phase of the rotor between the position of the first magnetic field change detecting section and the position of the third magnetic field change detecting section in the circumferential direction of the rotor is defined as a value θb, the first to third magnetic field change detecting sections are arranged in such a manner as to satisfy any one of the expressions described below:

$$\theta b = \theta a \times (1/4);$$

$$\theta b = \theta a \times (1/4) + 180°;$$

$$\theta b = \theta a \times (3/4); \text{ and}$$

$$\theta b = \theta a \times (3/4) + 180°.$$

3. The rotation sensor according to claim 2, wherein the angle θa is set to 120° and the angle θb is set to 270°.

4. The rotation sensor according to claim 1, wherein each of the first to third magnetic field change detecting sections includes a resolver coil.

5. A rotational angle detection apparatus that detects the electric angle of a rotor based on three-phase signals output from a rotation sensor, the rotation sensor including:
   a rotor having a rotational center;
   first, second, and third magnetic field change detecting sections that are arranged spaced apart in a circumferential direction of the rotor; and
   a magnetic field generating section that generates a magnetic field provided to the first to third magnetic field change detecting sections, wherein
   the magnetic field provided from the magnetic field generating section to the first to third magnetic field change detecting sections changes as the rotor rotates, and the first to third magnetic field change detecting sections output three-phase signals that change in correspondence with the rotational angle of the rotor, and
   when the angular intervals between the corresponding adjacent pairs of the first to third magnetic field change detecting sections about the rotational center of the rotor in the circumferential direction of the rotor are defined as first, second, and third division angles, the first to third magnetic field change detecting sections are arranged in such a manner that the first to third division angles are different from one another, and the rotational angle detecting apparatus comprises a controller that calculates first, second, and third calculated electric angles each representing a rotor electric angle, using the three-phase signals output from the rotation sensor and detects a malfunction in the rotation sensor based on the difference between any two of the first to third calculated electric angles.

6. The rotational angle detection apparatus according to claim 5, wherein the controller detects a malfunction in the rotation sensor when the difference is greater than or equal to a predetermined threshold value.

7. A resolver comprising:
three resolver coils arranged spaced apart in a circumferential direction of a rotor; and
an excitation coil that generates a magnetic field to induce voltages in the three resolver coils when receiving electric power, wherein
when, as the rotor rotates, the voltages induced in the three resolver coils are changed through change in the magnetic field provided from the excitation coil to each of the three resolver coils, the resolver outputs three-phase signals having amplitude that changes in a sinusoidal manner with respect to the rotational angle of the rotor, and
when the angular intervals between the corresponding adjacent pairs of the three resolver coils about the rotational center of the rotor in the circumferential direction of the rotor are defined as first, second, and third division angles, the three resolver coils are arranged in such a manner that the first to third division angles are different from one another.

8. A rotation sensor comprising:
a rotor having a rotational center;
first, second, and third magnetism detecting sections that are arranged spaced apart in a circumferential direction of the rotor; and
a magnetic field generating section that generates a magnetic field provided to the first to third magnetism detecting sections, wherein
the magnetic field provided from the magnetic field generating section to the first to third magnetism detecting sections changes as the rotor rotates, and the first to third magnetism detecting sections output three-phase signals that change in correspondence with the rotational angle of the rotor, and
when the angular intervals between the corresponding adjacent pairs of the first to third magnetism detecting sections about the rotational center of the rotor in the circumferential direction of the rotor are defined as first, second, and third division angles, the first to third magnetism detecting sections are arranged in such a manner that the first to third division angles are different from one another.

* * * * *